(12) United States Patent
Demougeot et al.

(10) Patent No.: US 8,997,499 B2
(45) Date of Patent: Apr. 7, 2015

(54) LOAD REJECTION AND RECOVERY USING A SECONDARY FUEL NOZZLE

(75) Inventors: Nicolas Demougeot, Jupiter, FL (US); Jon Glende, Smyrna, GA (US); Peter Stuttaford, Jupiter, FL (US)

(73) Assignee: Alstom Technology Ltd, Baden (CH)

( * ) Notice: Subject to any disclaimer, the term of this patent is extended or adjusted under 35 U.S.C. 154(b) by 1583 days.

(21) Appl. No.: 12/686,933

(22) Filed: Jan. 13, 2010

(65) Prior Publication Data

US 2011/0036094 A1 Feb. 17, 2011

Related U.S. Application Data

(60) Provisional application No. 61/157,400, filed on Mar. 4, 2009.

(51) Int. Cl.
| | |
|---|---|
| F02C 7/22 | (2006.01) |
| F02C 9/00 | (2006.01) |
| G05D 3/12 | (2006.01) |
| F02C 9/46 | (2006.01) |
| F02C 7/262 | (2006.01) |
| F02C 9/34 | (2006.01) |

(52) U.S. Cl.
CPC . *F02C 9/46* (2013.01); *F02C 7/262* (2013.01); *F02C 9/34* (2013.01)

(58) Field of Classification Search
CPC ................ F02C 9/28; F02C 5/02; F02C 9/16; F02C 7/36; Y02E 20/16; F05B 2270/303; F01D 17/162; F02K 3/00; B01J 19/0006; B01J 19/004; G01N 21/359
USPC ........ 60/773, 793, 776, 39.281; 700/286, 287
See application file for complete search history.

(56) References Cited

U.S. PATENT DOCUMENTS

| | | | | |
|---|---|---|---|---|
| 6,516,263 | B1* | 2/2003 | Keller ........................... | 701/100 |
| 7,165,405 | B2* | 1/2007 | Stuttaford et al. .............. | 60/737 |
| 7,457,688 | B2* | 11/2008 | Szepek et al. ................. | 700/287 |
| 2005/0217269 | A1* | 10/2005 | Myers et al. ................... | 60/739 |
| 2009/0044513 | A1* | 2/2009 | Fuller et al. ................ | 60/39.281 |

* cited by examiner

*Primary Examiner* — Lindsay Low
*Assistant Examiner* — Syed O Hasan
(74) *Attorney, Agent, or Firm* — Shook, Hardy & Bacon L.L.P.

(57) ABSTRACT

A system and way for controlling a gas turbine engine in the event of a partial or full load rejection from a generator is disclosed. Upon detection of a partial or full load rejection, the fuel flow of the combustor is directed to a secondary circuit of a secondary fuel nozzle to maintain a flame in a downstream chamber of the combustor. By maintaining the flame in the downstream chamber while the engine speed is controlled, the recovery process to a load condition avoids use of spark ignition system and flame detectors in the upstream chamber.

19 Claims, 8 Drawing Sheets

LOAD REJECTION AND RECOVERY USING A SECONDARY FUEL NOZZLE

CROSS REFERENCE TO RELATED APPLICATIONS

This application claims priority to U.S. Provisional Application Ser. No. 61/157,400, filed on Mar. 4, 2009.

TECHNICAL FIELD

The present invention generally relates to a partial or full load rejection and recovery of a gas turbine engine. More specifically, a process is identified for returning a gas turbine engine to an operating condition from a generator partial or full load rejection while preventing the gas turbine engine from overspeeding or tripping from loss of flame in the combustion section.

BACKGROUND OF THE INVENTION

Gas turbine engines operate to produce mechanical work or thrust. Specifically, land-based gas turbine engines typically have a generator coupled thereto for the purposes of generating electricity. The shaft of the gas turbine is coupled to the generator. Mechanical energy of the shaft is used to drive a generator to supply electricity to at least a power grid. The generator is in communication with one or more elements of a power grid through a main breaker. When the main breaker is closed, electrical current can flow from the generator to the power grid when there is a demand for the electricity. The drawing of electrical current from the generator causes a load to be applied to the gas turbine. This load is essentially a resistance applied to the generator that the gas turbine must overcome to maintain an electrical output of the generator.

Under normal operating conditions, the main breaker is in a closed position and electrical output from the generator is supplied to an electrical grid. However, when the main breaker is opened suddenly, as would occur during a full load rejection, the generator load on the shaft of the gas turbine engine drops to zero. Due to the inertia of the gas turbine engine under a load condition, the shaft speed can increase rapidly when the load is suddenly removed. As a result, the engine can overspeed, if care is not taken to control the unloading of the gas turbine engine. In certain configurations, a secondary breaker is used in addition to the main breaker. The secondary breaker is inserted in the power grid between a plant electrical network and the power grid. In some cases when the secondary breaker is opened suddenly, as would occur during a partial load rejection, the generator load on the shaft of the gas turbine drops sharply. However, the generator is still supplying electricity to the plant electrical network and hence the load on the shaft is highly reduced but remains greater than zero load. As for a full load rejection, this can result in engine overspeed and must be controlled to prevent engine damage. An overspeed can also occur when the breaker trips as a result of detecting a loss of flame in the combustor.

In order to control the engine speed when partially or fully unloaded, the fuel flow is typically reduced and redirected within the combustion system. Reducing the fuel flow will reduce the operating temperature and output of the turbine section, which will in turn, reduce the engine speed. However, care must be exercised when reducing and redistributing the fuel flow so as to maintain a stable flame in the combustor while also returning the engine to a condition capable of being reloaded as soon as possible, so as to minimize any time that electrical generation is interrupted in case of a full load rejection.

SUMMARY

In accordance with the present invention, there is provided a novel way of responding to a full or partial load rejection event to protect a gas turbine engine from an overspeed condition. The way of controlling the overspeed condition can be embodied in a set of computer executable instructions through a control program. The program can instruct movement of various valves to redirect fuel flow.

In an embodiment of the present invention, when an open main or secondary breaker is detected, all fuel flow is shifted from the plurality of primary fuel nozzles and a secondary fuel nozzle to only the secondary fuel nozzle. The main gas control valve position is set to a first setting. After a period of time, the main gas control valve is set to a second setting. The second setting is maintained until the gas turbine engine is functioning at a stable operating condition. If necessary, additional intermediate gas control valve set points may be included in this sequence until a stable operating point is achieved. The main gas control valve is then released so that it operates according to a normal fuel control setting. In the event of a full load rejection to full speed no load (or plant load), the main breaker is then closed. The next step is to close the transfer purge valves and shift the fuel flow from the secondary circuit of the secondary fuel nozzle to the transfer circuit of the secondary fuel nozzle. Where a full load rejection occurs, this step can be completed before the main breaker is closed or anytime after the main breaker is closed. The gas turbine engine is then re-loaded and the engine is returned to the premix operating mode.

In an alternate embodiment, a gas turbine engine is provided comprising an inlet, a compressor, at least one combustor having a plurality of fuel nozzles with at least two fuel circuits, a turbine, and a control system. The control system has a processor and a memory containing a series of computer-readable instructions that control fuel flow rate to the engine in case of a partial or full load rejection event to prevent overspeed, or tripping from loss of flame, of the gas turbine engine.

Additional advantages and features of the present invention will be set forth in part in a description which follows, and in part will become apparent to those skilled in the art upon examination of the following, or may be learned from practice of the invention. The instant invention will now be described with particular reference to the accompanying drawings.

BRIEF DESCRIPTION OF THE SEVERAL VIEWS OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different components, combinations of components, steps, or combinations of steps similar to the ones described in this document, in conjunction with other present or future technologies.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Figure 1:
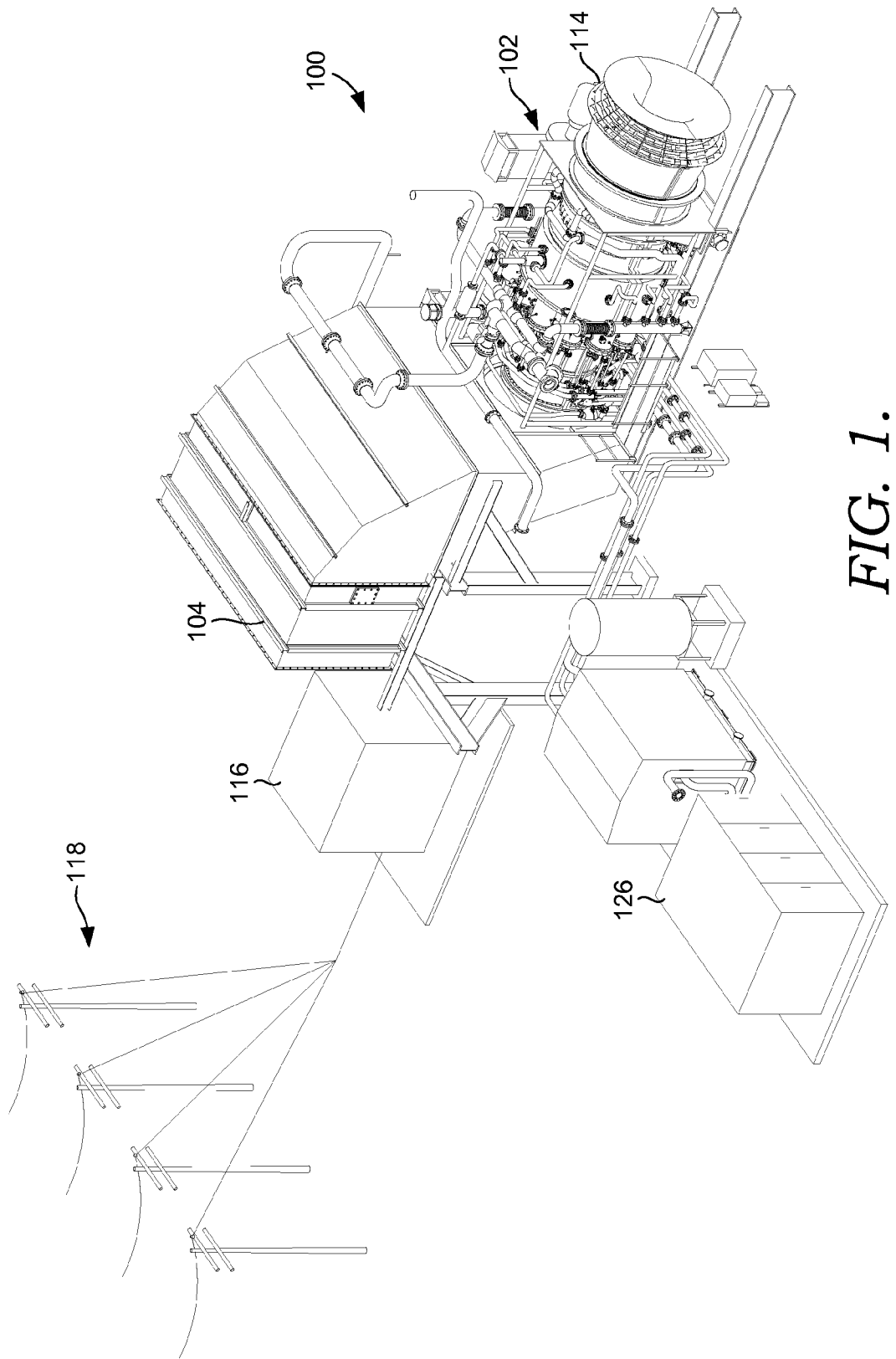
FIG. 1 is a perspective view of powerplant arrangement incorporating an embodiment of the present invention.
Figure 2:
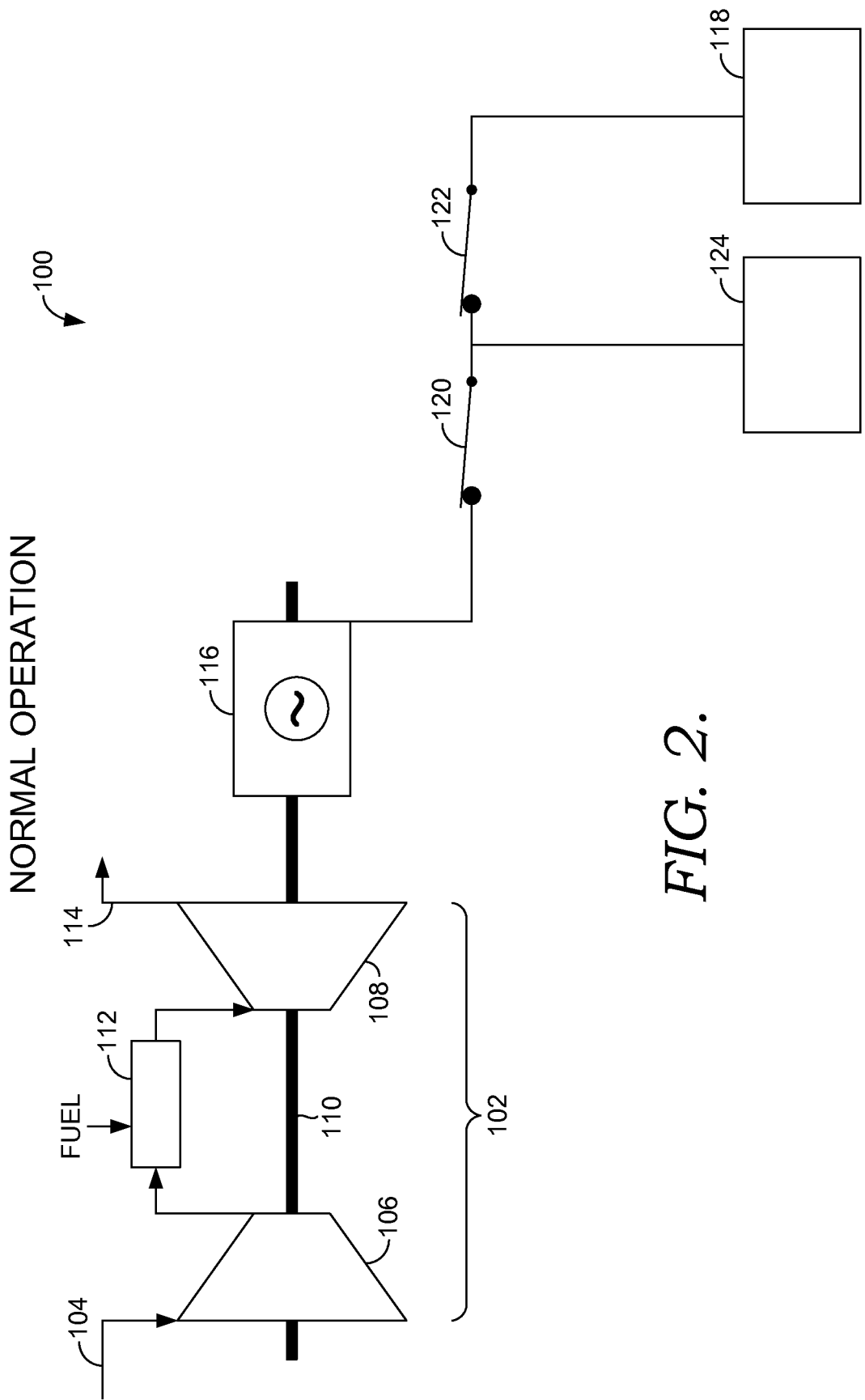
FIG. 2 is a schematic view of the powerplant arrangement of FIG. 1 including components of a gas turbine engine under a loaded operating condition, in accordance with an embodiment of the present invention.

Referring initially to FIGS. 1 and 2, a perspective view of a powerplant 100 and schematic view of a gas turbine engine 102, which incorporate a partial or full load rejection recovery system, are disclosed. The powerplant 100 comprises a gas turbine engine 102 having an inlet 104, an axial compressor 106 which is coupled to a turbine 108 by a shaft 110. Air from the compressor 106 is mixed with fuel and reacts in one or more combustors 112 to produce a hot working fluid that drives the turbine 108. The working fluid is then exhausted through a diffuser 114.

Figure 3:
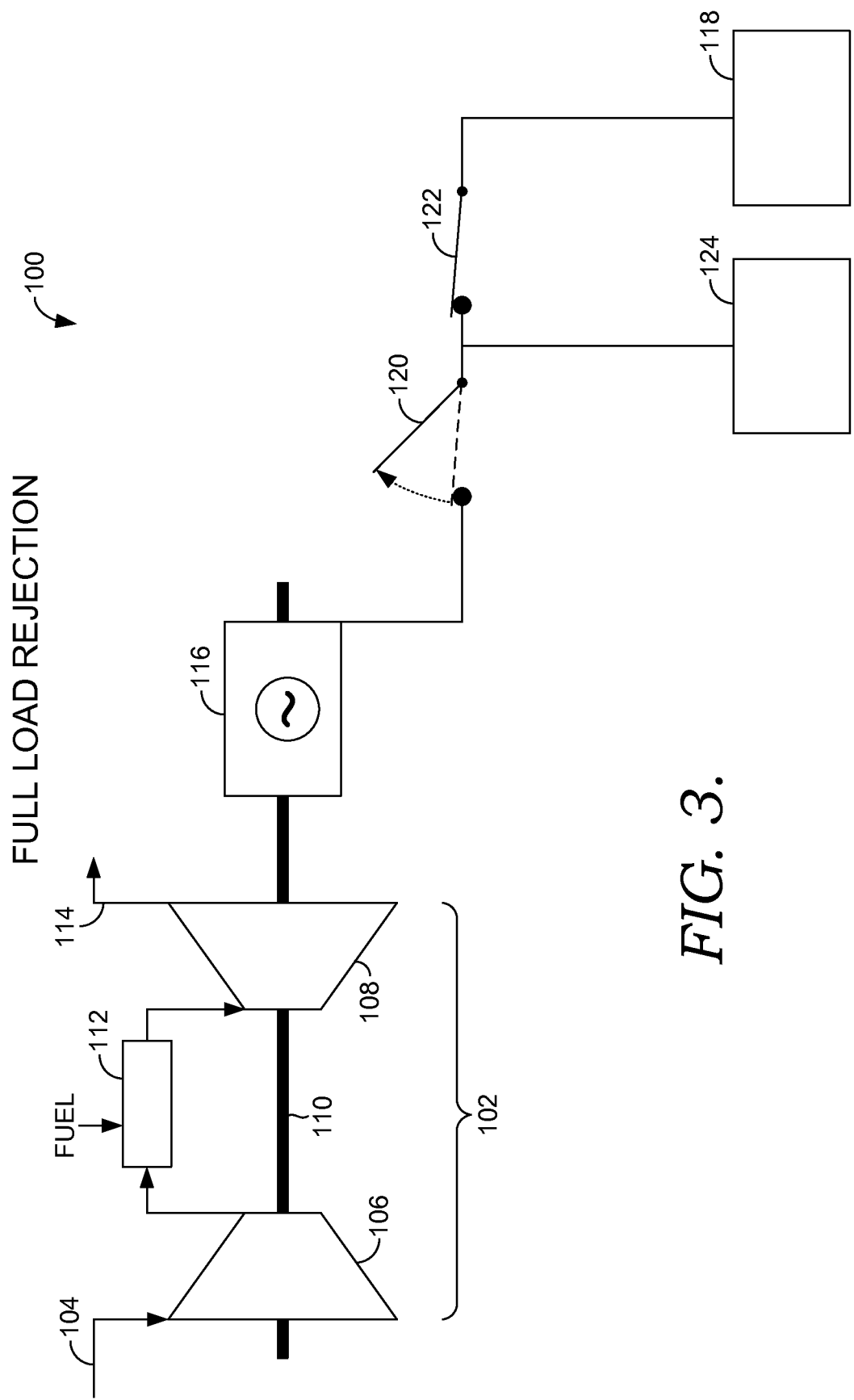
FIG. 3 is a schematic view of the powerplant arrangement of FIG. 1 where the gas turbine undergoes a full load rejection, in accordance with an embodiment of the present invention.
Figure 4:
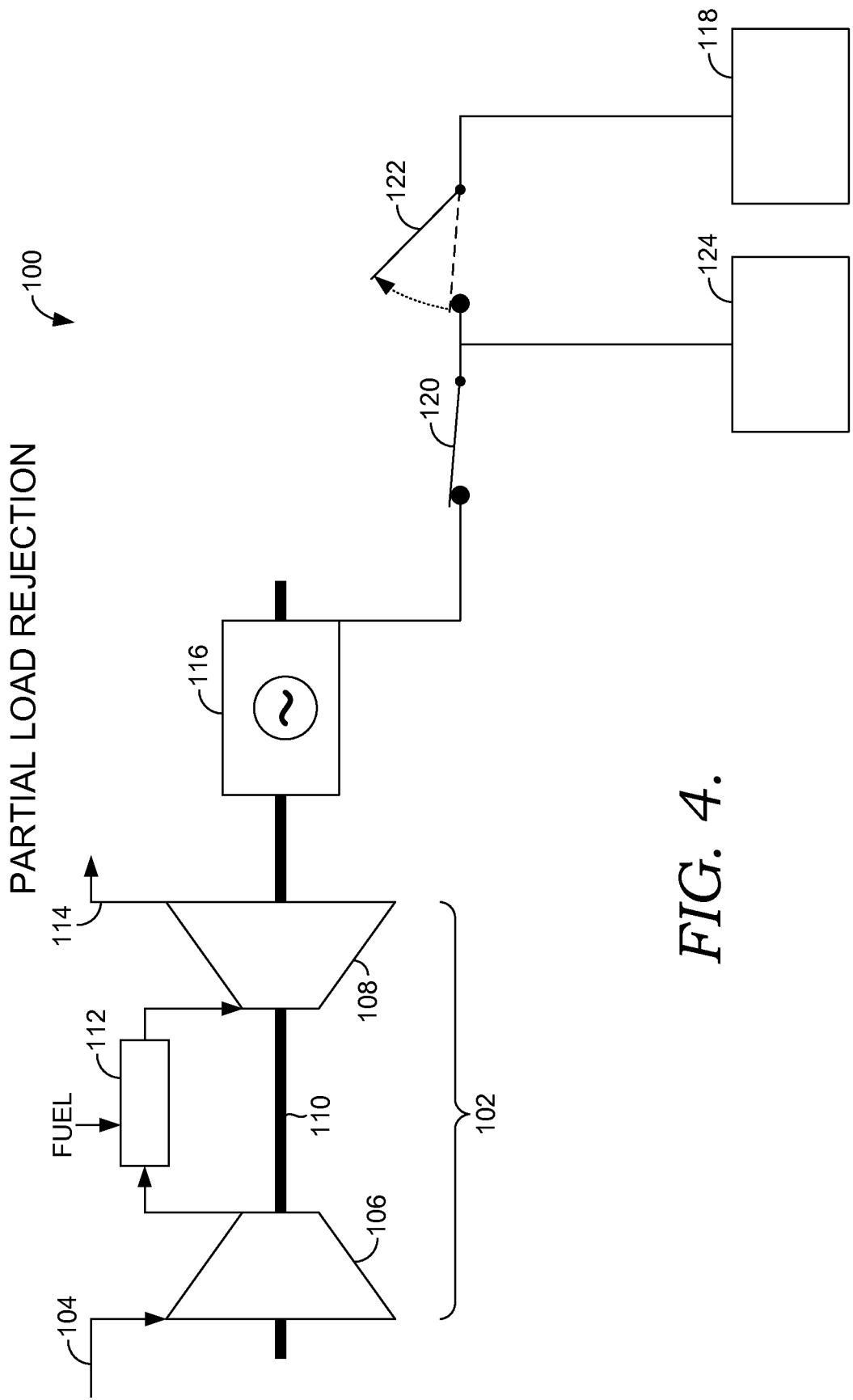
FIG. 4 is a schematic view of the powerplant arrangement of FIG. 1 where the gas turbine undergoes a partial load rejection, in accordance with an embodiment of the present invention.

With reference to FIGS. 2-4, various schematic views of the powerplant 100 are shown where electricity from generator 116 is supplied to one or more of the external electrical grid 118 and/or a plant electrical network 124. First, referring to FIG. 2, the gas turbine engine 102 is coupled to a generator 116 through the shaft 110. The mechanical energy of the shaft 110 is used to drive the generator 116, which supplies electricity to a power grid 118. The generator is in communication with one or more elements of the power grid 118 through at least a main breaker 120. When the main breaker 120 is closed, and a secondary breaker 122 is present and coupled to the main breaker 120, electrical current can flow from the generator 116 to the power grid 118 upon a demand for the electricity. The drawing of electrical current from the generator 116 causes a load to be applied to the gas turbine 102, where the load is a resistance applied to the generator 116 that the gas turbine 102 must overcome to maintain an electrical output of the generator 116.

Referring to FIG. 3, a schematic view of the powerplant 100 undergoing a full load rejection is depicted, where the load on the gas turbine 102 drops to zero Megawatts. This is caused by the main breaker 120 being open, which decouples the applied load from the power grid 118 and from the plant electrical network 124.

Referring to FIG. 4, an alternate embodiment of the powerplant 100 is depicted in which the gas turbine 102 undergoes a partial load reduction. This partial load reduction occurs when the secondary breaker 122 coupling the power grid 118 to the generator 116 is opened, breaking the load path between the power grid 118 and the generator 116. However, in this condition, the main breaker 120 is still closed such that the plant electrical network 124 still applies a load to the gas turbine engine and can receive electrical output, but the load is reduced compared to a normal base load condition of FIG. 2.

Figure 5:
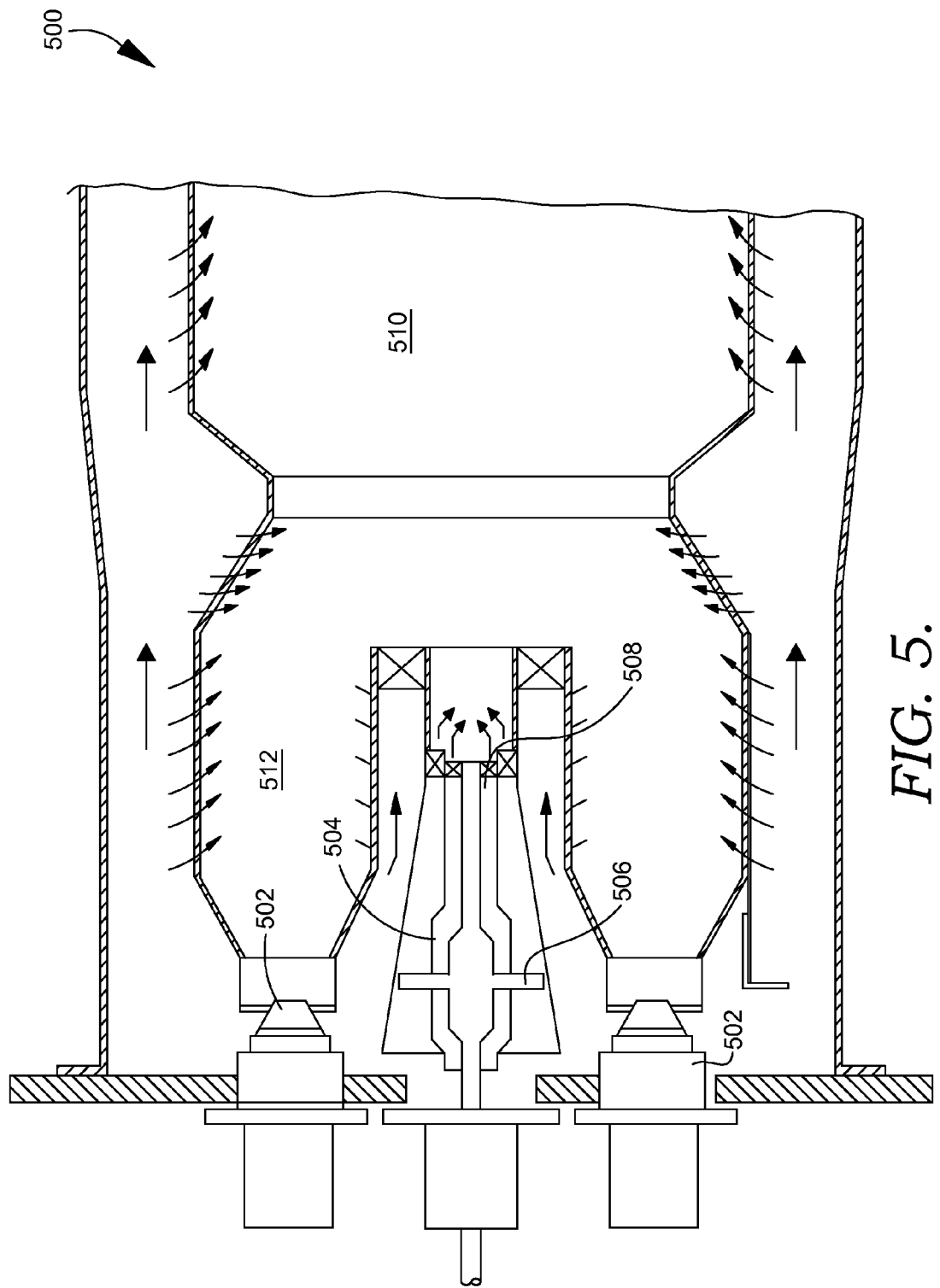
FIG. 5 is a cross section of a combustion system capable of operating in accordance an embodiment of the present invention.
Figure 7:
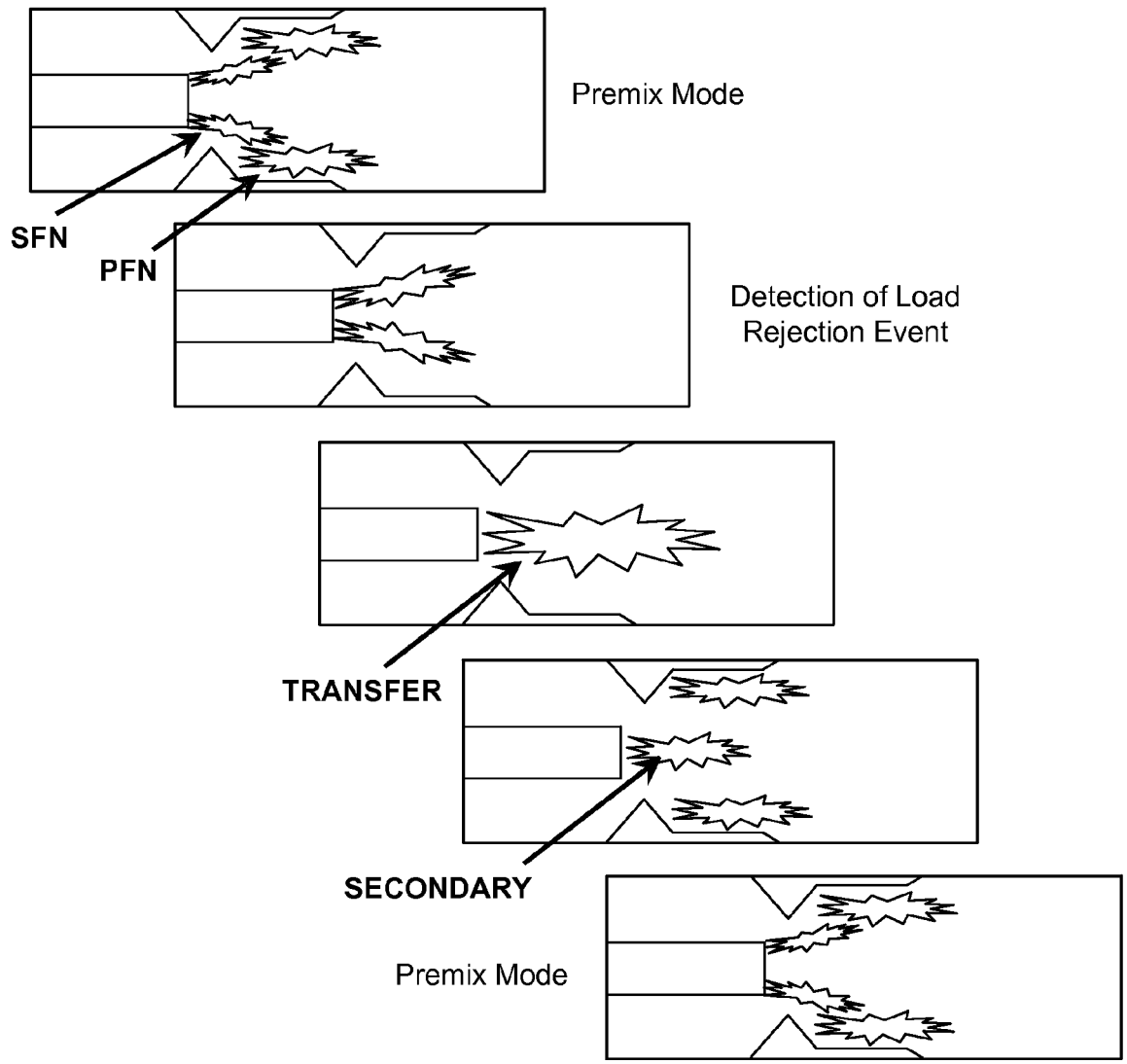
FIG. 7 is a chart depicting a gas turbine recovery to base-load operation in accordance with an embodiment of the present invention; and, FIG. 8 is a chart depicting a successful load rejection using the secondary fuel nozzle.

The load rejection system can operate in conjunction with a variety of combustion systems. One such combustor 112 is a dual stage combustion system 500 depicted in FIG. 5 and similar to a combustor disclosed in U.S. Pat. Nos. 4,292,801 and 4,982,570. The combustion system 500 includes two types of fuel nozzles—a set of primary fuel nozzles 502 located in an annular array about a secondary fuel nozzle 504, which is located generally along a centerline of the combustion system 500. In one embodiment, the secondary fuel nozzle 504 includes two fuel circuits, a secondary circuit 506 and a transfer circuit 508. In "premix" combustion mode operation, a small portion of the fuel passes through the secondary circuit 506 to establish a secondary flame in a downstream combustion chamber 510, while the majority of the fuel is injected into an upstream chamber 512 by the primary fuel nozzles 502 for mixing prior to combustion in the downstream chamber 510. A pictorial depiction of the flame location in "premix" combustion mode operation is shown in FIG. 7.

The combustion system 500 also includes an ignition system and flame detection system (not depicted). The ignition system is electrically powered and serves to ignite a flammable mixture in the upstream chamber 512 of the combustion system 500. The combustion system 500 uses flame detectors to verify an established flame in the upstream chamber 512 and/or the downstream chamber 510. The flame detectors are operating at all conditions and in conjunction with a control system 126 to ensure that fuel flow is directed to the proper fuel nozzle depending on the required operating condition and combustion mode. However, igniters, and especially spark igniters, are known to have some reliability issues. For example, as depicted in the following table, the time necessary to relight the upstream chamber and load recovery (LR) failure rate are shown for a spark ignition system.

| Sparks to light | Time to light | Load Rejection Recovery Rate |
|---|---|---|
| $1^{st}$ | 0.56 s | 99% |
| $2^{nd}$ | 1.12 s | 61% |
| $3^{rd}$ | 1.68 s | 3% |

It can be seen from this chart that the longer the delay in re-establishing a flame in the upstream chamber 512 because of failure of a spark to reignite the mixture, the more likely that immediate recovery from a full or partial load rejection event will not occur.

If an unstable power grid 118 causes an unforeseen interruption or reduction in electrical demand, in order to protect the gas turbine engine 102 and generator 116, the main breaker 120 or secondary breaker 122 can open (depending on the type and/or source of the interruption). This condition is shown in FIGS. 3 and 4 and effectively decouples the generator 116 from the power grid 118 or plant electrical network 124. As previously discussed, in an embodiment of the present invention, the secondary breaker 122 opens to protect the gas turbine 102 and generator 116 from an unstable power grid 118, but some electrical load is still supplied to the plant electrical network 124 through the main breaker 120. This operation state is commonly referred to as "Island Mode" or "Isochronus Mode." The opening of the main breaker 120 or secondary breaker 122 unexpectedly begins a partial or full load rejection sequence. Without proper control of the gas turbine engine during the load rejection event, the inertia necessary to overcome the load applied to the engine, will cause the shaft to overspeed when the load is suddenly removed or greatly reduced.

Figure 6:
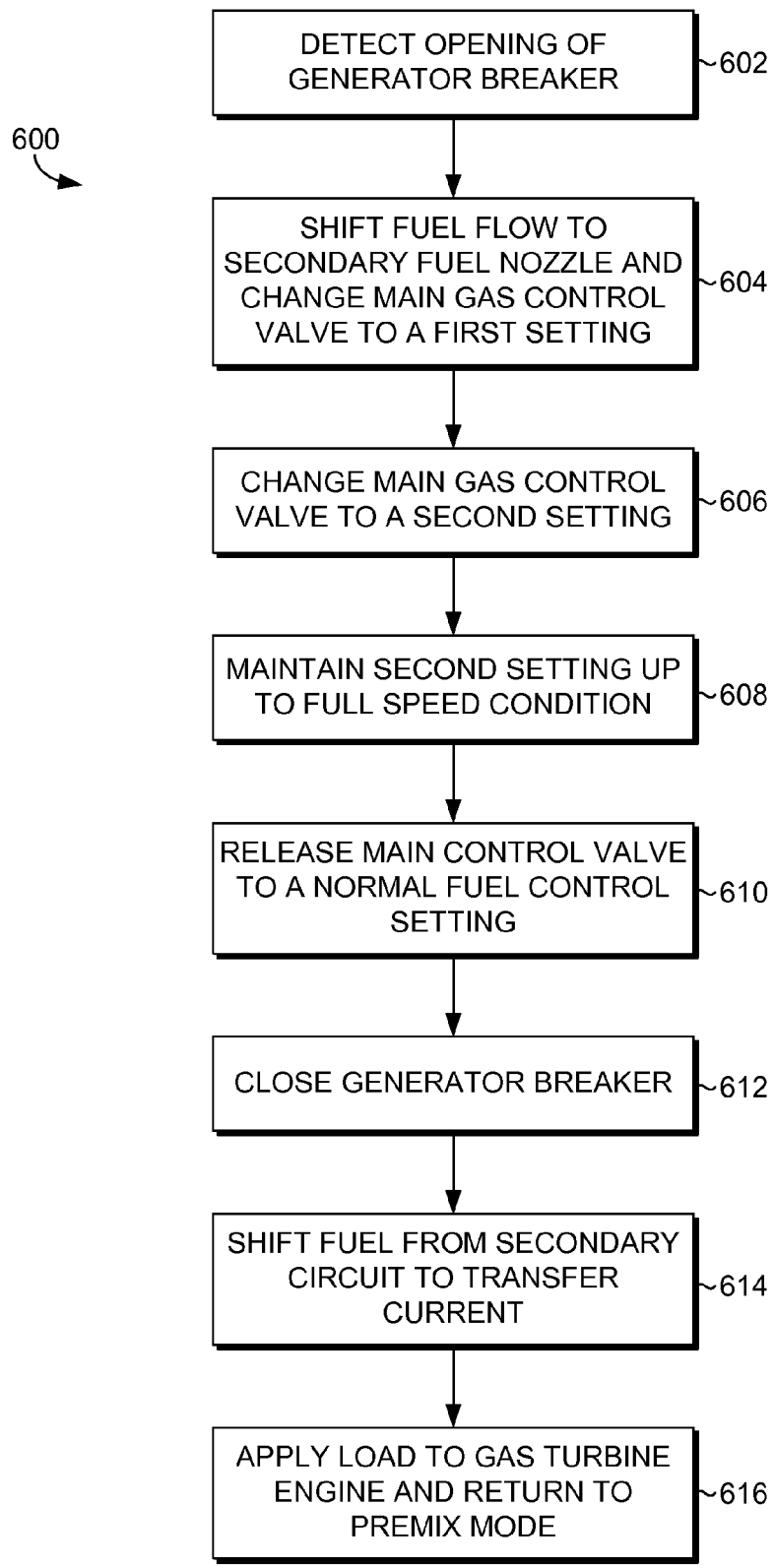
FIG. 6 is a flow chart depicting a process of recovering from a load rejection in accordance with an embodiment of the present invention.

The process depicted in FIG. 6 outlines a way in which overspeed of the gas turbine engine is prevented by ensuring a stable flame is maintained in the combustor. The process 600 begins in a step 602 with detecting the opening of a breaker. Upon detection of the open breaker, in a step 604, the fuel flow for the "premix" combustion mode is shifted from the primary and secondary fuel circuits to exclusively the secondary circuit of the secondary fuel nozzle so as to maintain the secondary flame in the downstream chamber. In parallel with this fuel split shift between the primary and secondary fuel circuits, a main gas control valve is moved and set to a first setting, which corresponds to a lower fuel flow than the setting before the load rejection event. This lower fuel flow will remove sufficient energy from the gas turbine engine 102 so as to ensure that the engine does not experience unsafe overspeed of the turbine while maintaining enough fuel to ensure the combustion flame is not extinguished. After a short time period, approximately one to three seconds, in a step 606, the main control valve is changed to a second, and lower, setting to further reduce the fuel flow. In a step 608, the second fuel setting is maintained while the turbine returns to the desired operating speed. The specific engine speed depends on the gas turbine flame and electrical grid frequency.

Once the gas turbine engine is at the operating speed, in a step 610, the restrictions on the main control valve are removed and the main control valve again follows the normal fuel scheduling sequence. In a step 612, in case of a full load rejection, the breaker to the generator is closed. In a step 614, the control sequence causes the fuel to be directed from the secondary fuel circuit of the secondary fuel nozzle to the transfer circuit of the secondary fuel nozzle, so as to improve the stability of the combustor. Steps 612 and 614 can be interchanged depending on hardware, software, or operating preferences. In a step 616, the load from the generator to the gas turbine engine is reapplied or increased. When the load is high enough, the fuel is redirected to the primary fuel circuit and secondary fuel circuit of the secondary fuel nozzle such that the engine returns to operate at the "premix" combustion mode. Consequently, the gas turbine is fully recovered from a partial or full load rejection event.

By directing the fuel flow to the secondary fuel nozzle and maintaining a stable flame in the already burning downstream chamber, the process of igniting flame in the upstream chamber and having to detect it before shifting the fuel to the primary fuel circuit is avoided. Such a process reduces the dependency on the optical flame detectors and spark igniters that detect flame in the upstream chamber by keeping the flame in the downstream chamber alone.

Referring now to FIG. 7, a pictorial chart is provided which depicts the various flame locations as a gas turbine engine undergoes a full load rejection event. On load, in "premix" combustion mode, the flame is located in a downstream chamber and fuel is supplied by both the primary fuel nozzles (PFN) and secondary fuel nozzle (SFN). Upon detection of the partial or full load rejection event, 100% of fuel flow is directed to the secondary circuit of the SFN. Fuel flow is then shifted to the transfer circuit of the SFN before or while the gas turbine engine is reloaded up to the "premix" combustion mode operating range. The fuel flow is then shifted back to the primary circuit (to premix in the upstream chamber) and the secondary circuit of the SFN. As it can be seen from the pictorial depiction in FIG. 7, by using the secondary and transfer circuits of the SFN to recover from a load rejection event, flame is not re-established in the upstream chamber, eliminating reliance upon spark igniters and flame detectors to establish and maintain a stable flame while the engine recovers and re-loads.

Figure 8:
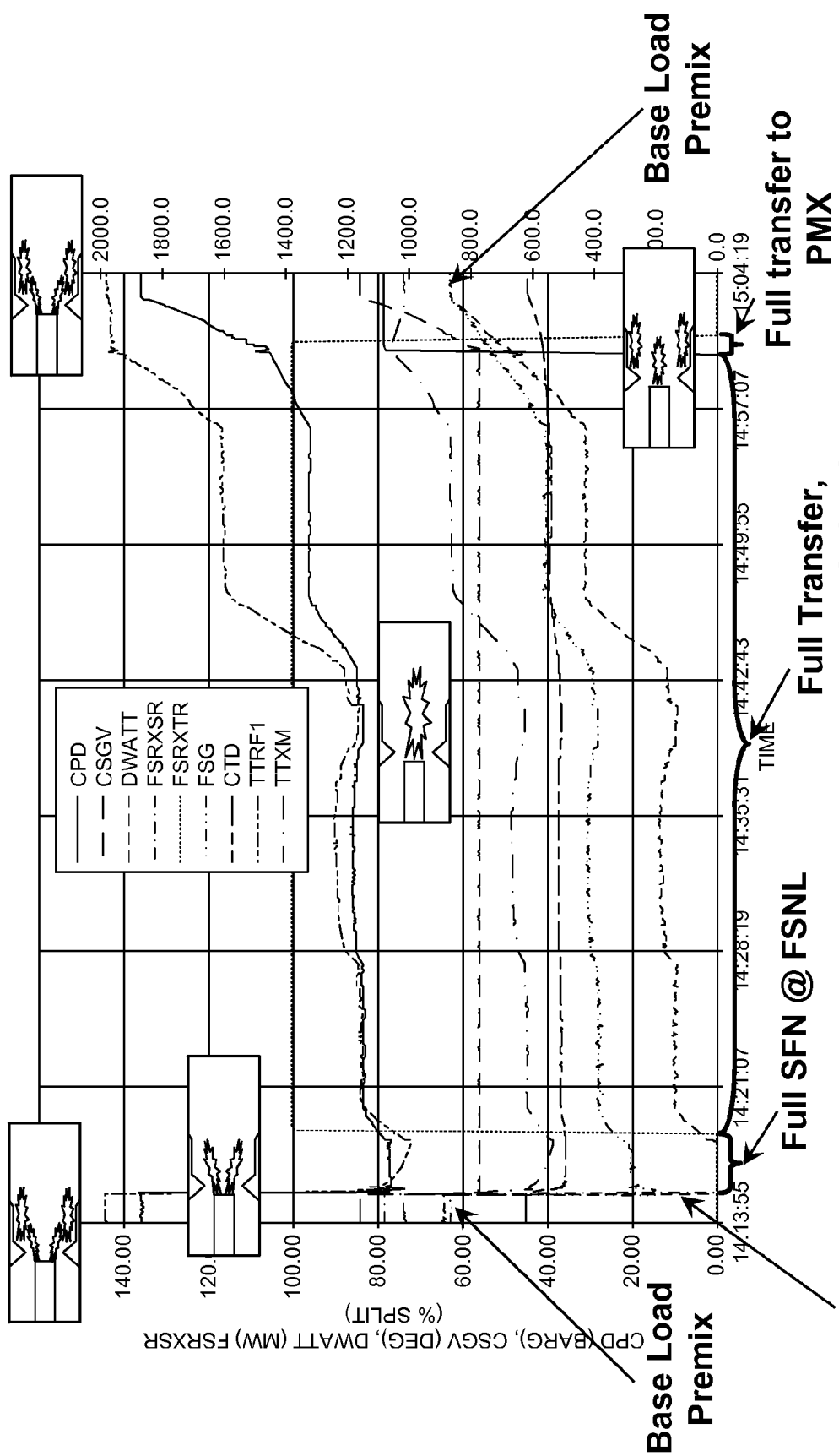

Referring to FIG. 8, a chart depicts a gas turbine engine operating at baseload in "premix" combustion mode and undergoes a load rejection event. The chart shows as a function of time, the various modes the combustor goes through as well as the duration of each mode of operation for the full recovery back to baseload in "premix" combustion mode. One set of data included in FIG. 8 is "DWATT", which shows the change in Megawatts of the engine during the full load rejection event, where the load drops to zero megawatts, before increasing, back to approximately 60 Megawatts when the gas turbine engine returns to Base Load Premix.

In an alternate embodiment of the present invention, it is possible for the full or partial load recovery to be completed in a combustion system in which the secondary fuel nozzle does not have a dedicated transfer circuit. Different configurations of dual stage combustors can operate with a secondary fuel nozzle that only includes a secondary circuit. In this configuration, the process outlined in FIG. 6 is followed except step 614 is eliminated and the fuel flows through only the secondary circuit until a load is applied to the gas turbine engine and the engine returns to a premix mode. In this embodiment, the secondary circuit has different size fuel injection orifices to compensate for the additional fuel flow required to pass through the secondary circuit.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and within the scope of the claims.

What is claimed is:

1. A method of controlling a gas turbine engine during a load rejection event, the method comprising:
    detecting an opening of one or more breakers that interrupts normal operation of the gas turbine engine;
    shifting all fuel flow for a combustor previously split between a plurality of primary fuel nozzles and a secondary fuel nozzle to only a secondary fuel circuit of the secondary fuel nozzle, while excluding a transfer fuel circuit of the secondary fuel nozzle, and while changing a main gas control valve position to a first setting;
    wherein the primary fuel nozzles are located in an annular array about the secondary fuel nozzle, the primary fuel nozzle located proximate an upstream chamber and adapted for injecting fuel into the upstream chamber during normal operation;
    and wherein the secondary fuel nozzle comprises the secondary fuel circuit and the transfer circuit is located along a centerline of the gas turbine engine, the secondary fuel circuit adapted to pass fuel to a transfer circuit proximate a downstream chamber to establish a secondary flame in the downstream chamber during normal operation;
    holding the fuel flow at the first setting;
    changing the main gas control valve to a second setting;
    holding the fuel flow at the second setting until the gas turbine engine returns to a predetermined operating speed condition;
    releasing the main gas control valve to a normal fuel control setting;
    closing the one or more breakers;
    confirming the one or more breakers are closed; and,
    re-loading the gas turbine engine and returning the combustor to a premix operating mode.

2. The method of claim 1, wherein the one or more breakers includes a main breaker in selective communication with a plant electrical network and an external electrical grid.

3. The method of claim 2, wherein the one or more breakers further includes a secondary breaker in selective communication with the main breaker and the external electrical grid.

4. The method of claim 1, wherein the second setting further reduces the fuel flow through the main gas control valve from the first setting.

5. The method of claim 1 further comprising changing the main gas control valve to one or more additional settings between the first and second settings.

6. The method of claim 1, prior to re-loading the gas turbine engine and returning to premix operating mode, further comprises:
    closing a transfer purge valve;
    confirming the one or more breakers are closed and the transfer purge valve is closed; and,
    maintaining a stable flame in a downstream chamber by shifting fuel from the secondary fuel circuit to the transfer circuit of the secondary fuel nozzle, wherein the transfer circuit maintains the stable flame from a position more proximate to the downstream chamber than the secondary circuit.

7. The method of claim 1, prior to re-loading the gas turbine engine and returning to premix operating mode, further comprises:
    closing a transfer purge valve;
    confirming the transfer purge valve is closed;
    maintaining a stable flame in a downstream chamber by shifting fuel from the secondary fuel circuit to the transfer circuit of the secondary fuel nozzle, wherein the transfer circuit maintains the stable flame from a position more proximate to the downstream chamber than the secondary circuit; and
    confirming the one or more breakers are closed.

8. A control system for a gas turbine engine comprising a processing device having a memory component capable of storing one or more sets of computer-executable instructions for:
    a) identifying a load rejection event;
    b) adjusting a plurality of fuel control valves in fluid communication with a fuel source and at least a primary and secondary fuel circuit of one or more combustors of the gas turbine engine;
    c) directing the plurality of fuel control valves to direct fuel flow to only a secondary fuel circuit of a secondary fuel nozzle, while excluding a transfer fuel circuit of the secondary fuel nozzle, until the engine speed is stabilized, the secondary fuel nozzle, comprising the secondary fuel circuit and the transfer circuit, is located along a centerline of the gas turbine engine, the secondary fuel circuit adapted to pass fuel to a transfer circuit proximate a downstream chamber to establish a secondary flame in the downstream chamber during normal operation; and
    d) adjusting the plurality of fuel control valves to increase fuel flow as engine speed and load increase.

9. The control system of claim 8, wherein the load rejection event is either a full load rejection or a partial load rejection.

10. The control system of claim 9, wherein the partial load rejection is detected when a secondary breaker opens and load demand on the gas turbine engine drops from a full load condition to an intermediate load condition.

11. The control system of claim 9, wherein the full load rejection is detected when a main breaker opens and load demand on the gas turbine drops from a full load condition to a no load condition.

12. The control system of claim 8, wherein the computer executable instructions are further capable of reducing the fuel flow until the engine returns to a predetermined operating speed condition, at which time fuel flow is directed to both a plurality of primary fuel nozzles and the secondary fuel nozzle.

13. A powerplant comprising:
    a gas turbine engine;
    a generator coupled to the gas turbine engine;
    a main breaker removably coupled to the generator;
    a plant electrical network in communication with the generator through the main breaker;

a power grid in communication with the generator through a secondary breaker; and, a control system associated with the gas turbine engine having a set of computer executable instructions embodied thereon for performing a method of controlling fuel flow to the gas turbine engine, such that upon detection of a load rejection event, fuel flow is directed exclusively to a secondary fuel nozzle for injection into a downstream chamber of a combustor so as to maintain flame stability in the combustor while reducing speed of a turbine, the secondary fuel nozzle having a secondary fuel circuit of the secondary fuel nozzle and a transfer fuel circuit, wherein the fuel flow is excluded from the transfer fuel circuit of the secondary fuel nozzle.

14. The powerplant of claim 13, further comprising a secondary breaker in selective communication with the main breaker and the power grid.

15. The powerplant of claim 13, wherein the gas turbine engine comprises one or more combustors, each combustor having a plurality of primary fuel nozzles and the secondary fuel nozzle wherein the primary fuel nozzle has a primary fuel circuit and the secondary fuel nozzle has at least the secondary fuel circuit.

16. The powerplant of claim 15, wherein the secondary fuel nozzle has only the secondary circuit having different size fuel injection orifices or wherein the secondary fuel nozzle has the secondary circuit and also has a transfer fuel circuit.

17. The powerplant of claim 13, wherein the load rejection event is a full load rejection when the main breaker is opened.

18. The powerplant of claim 13, wherein the load rejection event is a partial load rejection when the main breaker is closed and the secondary breaker is opened, such that electricity is still supplied to the plant electrical network.

19. The powerplant of claim 13, wherein upon stability of a flame in the combustor and reduced engine speed, a main gas control valve is released to a normal fuel control setting and the one or more breakers are closed.

* * * * *